United States Patent Office 3,246,627
Patented Apr. 19, 1966

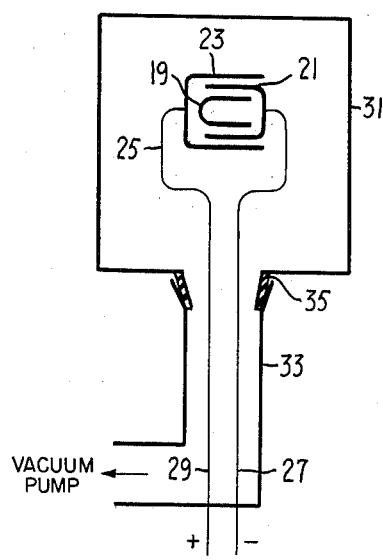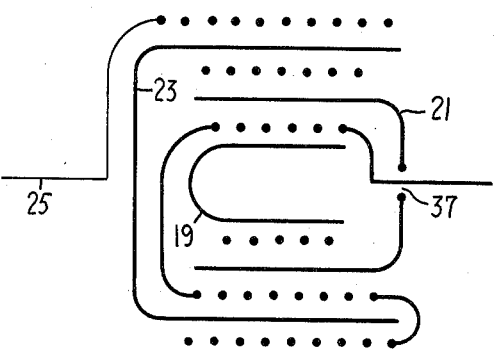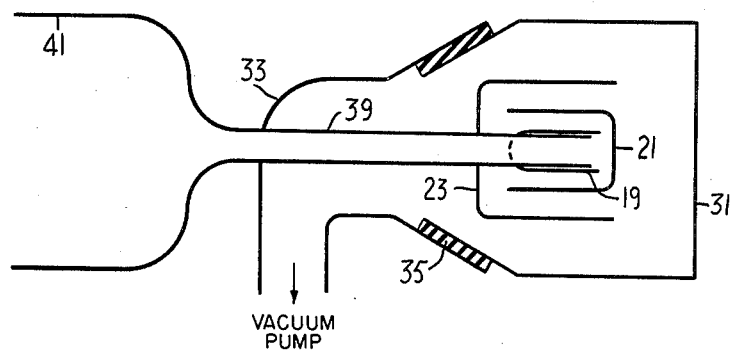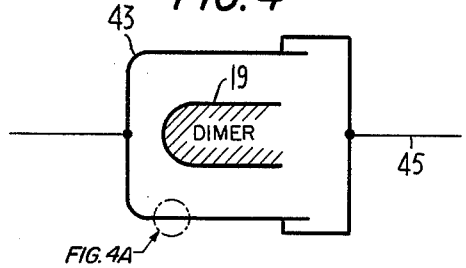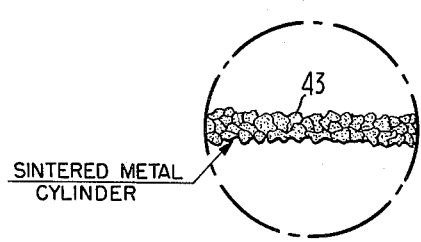

3,246,627
APPARATUS FOR VAPOR DEPOSITION
William E. Loeb, Martinsville, Frederick R. Tittmann, Plainfield, and James H. Bowen, Somerville, N.J., assignors to Union Carbide Corporation, a corporation of New York
Filed Oct. 5, 1962, Ser. No. 228,620
16 Claims. (Cl. 118—49)

This invention relates to apparatus for applying a coating of a synthetic organic polymer to a suitable substrate surface. More particularly, the present invention is directed to apparatus for coating the surfaces of containers, electrical components, wire, plastic and metallic films, sheets, and the like with a uniform coating of a truly linear thermoplastic film of poly(p-xylylene) or derivatives thereof.

Poly(p-xylylenes) have found great utility in the field of surface coatings due to their high resistance to thermal and chemical deterioration. Wholly unlike conventional synthetic organic polymers, however, it is necessary, in order to successfully coat a surface with a truly linear poly(p-xylylene) film, to first cleave the cyclic dimer, di-p-xylylene, to obtain the reactive vaporous diradicals and thereafter condense these vaporous diradicals on the desired substrate surface, whereupon said diradicals condense and simultaneously polymerize to form a linear homopolymeric or copolymeric film depending upon the choice of the initial dimeric reactants, system pressure, and the temperature of the substrate surface.

The reactive vaporous diradicals hereinabove mentioned can be produced by the pyrolytic cleaveage of at least one cyclic dimer represented generally by the structure

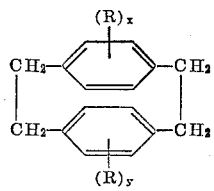

wherein R is an aromatic nuclear substituent, $x$ and $y$ are integers from 0 to 3, inclusive, thus forming 2 separate reactive vaporous diradicals having the structure:

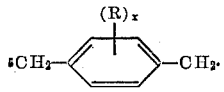

and

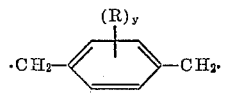

Thus, where $x$ and $y$ are the same, and the aromatic nuclear substituent on each diradical is the same, two moles of the same p-xylylene diradical are formed, and when condensed yield a substituted or unsubstituted p-xylylene homopolymer. When $x$ and $y$ are different or the aromatic nuclear substituents on each diradical are different, condensation of such diradicals will yield copolymers as hereinafter set forth.

Inasmuch as the coupling of these reactive diradicals does not involve the aromatic ring, any unsubstituted or nuclear substituted p-xylylene polymer can be prepared since the substituent groups function essentially as inert groups. Thus, the substituent group can be any organic or inorganic group which can normally be substituted on aromatic nuclei. As an illustration of such substituent groups are alkyl, aryl, alkenyl, amino, cyano, carboxyl, alkoxy, hydroxy alkyl, carbalkoxy, and like radicals as well as inorganic radicals such as hydroxyl, nitro, halogen and other similar groups which are normally substitutable on aromatic nuclei. Otherwise the position on the aromatic ring is filled by a hydrogen atom.

Particularly preferred of the substituted groups are those simple hydrocarbon groups such as the lower alkyls as methyl, ethyl, propyl, butyl, hexyl, lower aryl hydrocarbons such as phenyl, alkylated phenyl, naphthyl and like groups having no more than about 10 carbon atoms, and the halogen groups particularly chlorine, bromine, iodine, and fluorine.

The substituted di-p-xylylenes from which these reactive diradicals are prepared, can be prepared from the cyclic dimer, di-p-xylylene, by appropriate treatment, such as halogenation, acetylation, cyanolation, alkylation, and/or oxidation and reduction and like methods of introduction of such substituent groups into aromatic nuclei. Inasmuch as the cyclic dimer is a very stable product up to temperatures of about 400° C., elevated temperature reactions can also be employed for the preparation of various substituted materials. Hereinafter the term "a di-p-xylylene" refers to any substituted or unsubstituted cyclic di-p-xylylene as hereinabove discussed.

In the polymerization process, the vaporous diradicals condense and polymerize nearly instantaneously at the condensation temperature of the diradicals. The coupling of these diradicals involves such low activation energy and the chain propagation shows little or no preference as to the particular diradicals, that steric and electronic effects are not important as they are in vinyl polymerization. Thus substituted and/or unsubstituted p-xylylene homopolymers can be made by cooling the vaporous diradicals down to any temperature below the condensation temperature of the diradical. It has been observed that for each diradical species, there is an optimum ceiling condensation temperature above which the diradical will not condense and polymerize. All observed that for each diradical species, there is an optimum ceiling condensation temperature above which the diradical will not condense and polymerize. All observed ceilings of substantial p-xylylene diradicals have been pressure, the following condensation and polymerization ceilings are observed for the following diradicals.

|  | Degrees centigrade |
|---|---|
| p-Xylylene | 25—30 |
| Chloro-p-xylylene | 70—80 |
| Cyano-p-xylylene | 120—130 |
| n-Butyl-p-xylylene | 130—140 |
| Iodo-p-xylylene | 180—200 |

Thus, by this process, homopolymers are made by maintaining the substrate surface at a temperature below the ceiling condensation temperature of the particular diradical species involved, or desired in the homopolymer. This is most appropriately termed "homopolymerizing conditions."

Where several different diradicals existing in the pyrolyzed mixture have different vapor pressure and condensation characteristics, as for example p-xylylene, or cyano-p-xylylene and chloro-p-xylylene or any other mixture with other substituted diradicals, homopolymerization will result when the condensation and polymerization temperature is selected to be at or below that temperature where only one of the diradicals condense and polymerize. Thus, for purposes within this application, the terms "under homopolymerization conditions" are intended to include those conditions where only homopolymers are formed. Therefore it is possible to make homopolymers from a mixture containing one or more of the substituted diradicals when any other diradicals present have different condensation or vapor pressure characteristics, and wherein only one diradical species is condensed and polymerized on the substrate surface. Of course, other diradical species not condensed on the substrate surface can be drawn through the apparatus as hereinafter described, vaporous form to be condensed and polymerized in a subsequent cold trap.

Inasmuch as p-xylylene diradicals, for example are condensed at temperatures about 25° to 30° C., which is much lower than cyano p-xylylene diradicals, i.e., about 120° to 130° C. it is possible to have present such diradicals in the vaporous pyrolyzed mixture along with the cyano-substituted diradicals. In such a case, homopolymerizing conditions are secured by maintaining the substrate surface at a temperature below the ceiling condensation temperature of the substituted p-xylylene but above that the p-xylylene, thus permitting the p-xylylene vapors to pass through the apparatus without condensing and polymerizing but collecting the poly-p-xylylene in a subsequent cold trap.

It is also possible to obtain substituted copolymers through the pyrolysis process hereinabove described. Copolymers of p-xylylene and substituted p-xylylene diradicals, as well as copolymers of substituted p-xylylene diradicals wherein the substituted groups are all the same radicals but each diradical containing a differing number of substituent groups can all be obtained through said pyrolysis process.

Copolymerization occurs simultaneously with condensation upon cooling of the vaporous mixture of reactive diradicals to a temperature below about 200° C. under polymerization conditions.

Copolymers can be made by maintaining the substrate surface at a temperature below the ceiling condensation temperature of the lowest boiling diradical desired in the copolymer, such as at room temperature or below. This is considered "copolymerizing conditions," since at least two of the diradicals will condense and copolymerize in a random copolymer at such temperature.

In the pyrolytic process, the reactive diradicals are prepared by pyrolyzing a substituted and/or unsubstituted di-para-xylylene at a temperature less than about 700° C., and preferably at a temperature between about 550° C. to about 600° C. At such temperatures, essentially quantitative yields of the reactive diradicals are secured. Pyrolysis of the starting di-p-xylylene begins at about 450° C. regardless of the pressure employed. Operation in the range of 450°–550° C. serves only to increase time of reaction and lessen the yield of polymer secured. At temperature above about 700° C., cleavage of the substituent group can occur, resulting in a tri-/or polyfunctional species causing cross-linking or highly branched polymers.

Pyrolysis temperature is essentially independent of the operating pressure. It is however preferred that reduced or sub-atmospheric pressures be employed. For most operations, pressures within the range of 0.0001 to 10 mm. Hg absolute are most practical. However, if desired, greater pressures can be employed. Likewise, if desirable, inert vaporous diluents such as nitrogen, argon, carbon dioxide, steam and the like can be employed to vary the optimum temperature of operation or to change the total effective pressure in the system.

The hereinabove described polymerization process has heretofore been effected by employing apparatus which generally comprises a pyrolysis chamber having two temperature zones, a first zone provided with heating means sufficient to vaporize the dimer thereby preventing local overheating and degradation of the dimer which could occur with direct pyrolysis, and a second zone communicating with the first zone and provided with heating means sufficient to pyrolyze the vaporous dimer to reactive diradicals. A nozzled portion of tubing terminating the anterior end of the pyrolysis chamber penetrates one face of a coating chamber, said coating chamber and a portion of the nozzled tubing being enclosed in a vacuum chamber, thus providing a continuous linear passage for the reactive diradicals from the pyrolysis chamber to the coating chamber wherein condensation and polymerization occur.

Although the apparatus and method have shown themselves capable of producing poly(p-xylylene) coatings, they have also proved to be inefficient and uneconomical, ofttimes resulting in uneven coatings.

Thet high temperature of the pyrolysis zone has also effectively restricted the desirability of this method due to the limitation it imposes on the materials needed for the equipment and also the problem presented by temperature control in vacuum at such a high temperature level.

Accordingly, it is an object of the present invention to provide apparatus which can simultaneously vaporize and pyrolyze di-p-xylylenes in an efficient manner.

It is still another object of the present invention to provide a compact apparatus capable of coating internal and/or external substrate surfaces.

These and other objects of the present invention will become more apparent to those in the art from the ensuing discussion and drawings, in which:

FIG. 1 is a diagrammatic representation of the coating apparatus completely assembled within a chanber to be coated.

FIG. 2 is a vertical cross section of the vaporization-pyrolyzation oven showing the windings of the heating element.

FIG. 3 is a diagrammatic representation of a coating apparatus which provides for continuous coating.

FIG. 4 is a diagrammatic representation of a simplified coating apparatus with an enlarged view FIG. 4A of a section of the vaporization-pyrolyzation oven wall.

Now in accordance with the present invention, substrate surfaces can be internally and/or externally coated with a poly(p-xylylene) film by inserting into a chamber to be internally coated or into a chamber adapted to receive objects to be externally coated, a vaporization-pyrolyzation oven containing a di-p-xylylene, and provided with a labyrinthine exit passageway, evacuating the chamber and the oven, and thereafter maintaining the walls of said chamber and/or the objects therein at a temperature below about 200° C. while heating the di-p-xylylene in said oven under the reduced pressure thus obtained to a temperature of at least about 450° C. while retarding the emission of substantially all of the di-p-xylylene volatized therein for a period of time sufficient to pyrolyze said vaporized di-p-xylylene to the corresponding p-xylylene diradical species, and thereafter permitting the p-xylylene diradicals to emit into the evacuated space defined by the interior walls of said chamber whereby the p-xylylene diradicals impinge upon the cool inner walls of said chamber or upon other suitable surfaces placed therein and polymerize to form a poly(p-xylylene) coating thereon.

The vaporization-pyrolyzation oven which permits the accomplishment of the novel process of this invention comprises, in general, a heated composite vessel having as a means of communication between the innermost vessel thereof and the external atmosphere one or a plurality of labyrinthine exit passageways, the length of said passageways and the temperature being commensurate such that the egress of substantially all of the di-p-xylylene volatized therein is retarded for a period of time sufficient to pyrolyze said vaporized di-p-xylylenes to the corresponding p-xylylene diradical form.

A preferred embodiment of the present invention, as illustrated by FIG. 1, shows the vaporization-pyrolyzation oven comprised of inversely nested vessels 19, 21, and 23, each of said vesssels having lateral side walls and one end wall and being substantially open at one end, each of said vessels being of different size and of a conforming shape with all the other vessels such that when a smaller vesssel is inserted in a spaced relationship into a larger vessel with the open end of said smaller vessel adjacent the interior face of the end wall of said larger vessel, a labyrinthine exit passageway is formed communicating from the interior of said smaller vessel to the open end of said larger vessel; the innermost of said inversely nested vessels 19 being adapted to contain a di-p-xylylene; means for heating said inversely nested vessels such as a heating element 25 continuously wound in series about the outer surfaces of each of said inversely nested vessels, said heating element 25 having terminal portions leading to a current source (not shown) through tubular supports 27 and 29; a vacuum tight chamber 31 surrounding said inversely nested vessels and adapted to encompass articles to be coated or to be itself internally coated, said chamber 31 being held in communication with a vacuum line 33 leading to a vacuum pump (not shown) by means of a gasket 35 or other suitable means.

Although the actual number of vessels employed in the vaporization-pyrolyzation oven is not considered critical, it is important however, that there be a sufficient number of nested vessels present to provide an effective length of passage commensurate with the temperature to efficiently retard the egress of the vaporous di-p-xylylene for a period of time sufficient to pyrolyze the vapors to reactive diradicals. As is clear to those in the art, a greater or lesser number of vessels than that shown can be used without departing from the scope of the present invention. An increase or decrease of the number of vessels will only effect the efficiency of the process. In a preferred embodiment, three vessels alternating in the manner hereinabove described have been found to be most efficient.

Referring now to FIGURE 2, the diagrammatic representation of the simultaneous vaporization-pyrolyzation oven shows the continuous series windings of the heating element 25 and the labyrinthine passageway afforded by the inversely nested vessels 19, 21, and 23. Vessel 21 having an aperture 37 through the end wall thereof which permits convenient passage of the heating element 25. Said heating element 25 can be wound about the outer surface of the inversely nested vessels as described above or can be built into the vessel walls. As is apparent to those in the art, the manner in which the heating element 25 is wound or is affixed to the vessel walls is not critical providing the heating element, so placed, is capable of transferring sufficient heat to vaporize the di-p-xylenes and subsequently pyrolyze the vaporized dimer to reactive diradicals.

As shown in FIGURE 3, the apparatus can be easily modified to provide a means for continuous coating. The modified apparatus contains as an additional element a conduit 39, said conduit 39 communicating the interior of the innermost of the inversely nested vessels 19 with a source of di-p-xylene, such as extruder 41, outside the vacuum tight container 31 encompassing the inversely nested containers, the sole egress point of said di-p-xylylene from said conduit 39 being located in the interior of the innermost vessel 19 of said inversely nested vessel.

Another embodiment shown in FIG. 4 illustrates a simplified vaporization-pyrolyzation oven comprised of a vessel 19 completely encompassed by a continuous microporous wall 43, said vessel 19 being adapted to receive a di-p-xylylene. The microporous wall as shown in enlarged view FIG. 4A can be composed of a porous, heat-conducting material such as porcelain and suitable high temperature glass and be heated by external means (not shown) or it may be composed of porous, electrically and heat conducting materials such as metal, graphite, and the like and be heated directly through leads 45. It is considered critical that the labyrinthine passageways or capillaries through the microporous wall be of sufficient length so that the retention time of the vaporized dimer contained therein and the temperature of the wall be commensurate to provide efficient pyrolysis of the vaporized dimer to the diradical without decomposition or charring. It is also important that the capillary pore openings be of micron sizes between about 0.1 and about 200 microns in diameter in order that the capillary openings sufficiently retard the efflux of vaporized dimer.

Porous materials such as sintered metal, sintered glass, graphite, and porcelain have been found to be advantageously adaptable as microporous wall materials. The tortuous path afforded by the sintered material effectively increases the capillary length to one which is greater than the measurable thickness of the wall thereby increasing the retention time of the vaporous dimer at the temperature of pyrolysis thus providing an efficient, yet simple means of pyrolysis. The tortuous path afforded by a capillary on its meandering journey through the microporous wall is, in essence, equivalent to the labyrinthine passageway of the apparatus shown in FIGURE 1.

The apparatus can easily be modified in size and shape. The only necessary requirements appear to be that the temperature be high enough and the residence time as regulated by the labyrinthine or tortuous passageways provided by the walls of the oven, the sintered oven walls, or other suitable retarding means be long enough so that the dimer is completely vaporized and that pyrolyzation to the diradical is essentially complete.

The pyrolysis temperature is essentially independent of Average dimer sublimation times have been found to be less than one minute per gram as compared to three minutes per gram via the triple zoned apparatus of the prior art. The efficiency of the pyrolysis to the diradical has been raised 100% as compared to the prior apparatus. Preferably average total residence time per unit weight within the vaporization-pyrolyzation oven, said residence time including the time for both vaporization and pyrolyzation, can range from 0.0001 to 1.0 minutes/gram.

The vessels can conveniently be made of glass, metal, graphite, ceramics, or other suitable high temperature materials.

Any heating element which can easily provide the necessary pyrolysis temperature can be suitably employed. Preferably, Nichrome wire is used.

Di-p-xylylenes can be pyrolyzed at temperatures less than about 700° C., and preferably at a temperature between about 550° C. to about 600° C. At such temperatures, essentially quantitative yields of the reactive diradical are secured.

The pyrolysis temperature is essentially independent of the operating pressure. It is however preferred that reduced or sub-atmospheric pressures be employed. For most operations, pressures within the range of about 0.001 to 10 mm. Hg absolute are most practical.

The chamber to be coated or the articles within said chamber should be maintained at temperatures below about 200° C. The diradicals species which do not condense at the temperature level maintained within the chamber are drawn through said chamber as a consequence of the vacuum impressed upon the system and can be subsequently condensed and polymerized in cold traps in the vacuum line.

The examples shown below are illustrative of the novel method that has herein been described. The examples are in no way intended to restrict the scope of the present invention.

*Example 1*

0.3 gram of dichloro-di-p-xylene was placed in a ¼-inch diameter glass ampoule that was about ¾ inch in length and sealed at one end. This ampoule was placed inside a Nichrome wire spiral. The combination was then placed within a glass container which was open on one end and sealed at the other with the exception of one small hole in the center through which the Nichrome wire, which was about 0.051 inch in diameter, was passed. This container was also wound with said Nichrome wire and placed in a chamber sealed at one end and open at the other and also wound with said wire. The total resistance in the wire circuit was 1.4 ohms. A 120-volt Variac was connected through copper leads to the wire. The copper leads sealed in capillary tubing with Apiezon wax were led through a small vacuum chamber.

After being assembled, the system was evacuated to 0.02 mm. Hg. absolute. The current was turned on and showed 15 amperes at 20 volts. After ten seconds, the wire glowed a brilliant red. Within fifteen additional seconds, the dimer had completely evaporated and subsequently deposited on the walls of the chamber as a clear film of poly(chloro-p-xylylene). The current was then turned off and the apparatus allowed to cool. After cooling, the chamber was opened to the atmosphere and the film was removed. Although slightly greasy with the vacuum grease, the film weighed 0.3 gram showing that the vaporization had been complete. Infrared analysis showed almost no absorption, at 14.2μ. If unreacted dimer had been present in the polymer a strong band would have been present in that region. This leads to the conclusion that the pyrolysis of dimer to diradical was essentially complete.

*Example II*

1.0 gram of dichloro-di-p-xylylene was placed in a 3 inch sintered, porous, stainless-steel, hollow cylinder having an inside diameter of 0.5 inch and a wall thickness of 1/16 inch. The cylinder was closed with sintered metal at one end and a stainless-steel screw cap at the opposite end. The sintered metal had a pore size of 25 microns. The loaded cylinder was mounted on a laminated phenolic board having steel supports at either end. The steel supports were equipped with screws for the necessary electrical connections.

The cylinder was placed in a long Pyrex glass vacuum chamber. The power leads, consisting of heavy wire soldered into metal-to-glass seals, were attached by means of screws to the steel supports at either end of the phenolic mounting board. The portion of the wire power leads which were external to the vacuum chamber formed a four turn secondary winding on a 1000-volt ampere transformer. The primary winding of the transformer was energized by a 220 volt autotransformer. The system was evacuated to about $4 \times 10^{-5}$ mm. Hg, absolute. The autotransformer was turned on and the voltage was regulated to allow about 100 amperes to flow through the sintered metal cylinder. In approximately 10 seconds, the cylinder glowed bright red. The dichloro-dipxylylene within the sintered cylinder sublimed and was pyrolyzed to form chloro-p-xylylene diradicals. The vaporous diradicals which formed upon passage through the sintered walls of the container condensed and spontaneously polymerized on the walls of the vacuum chamber to form poly (chloro-p-xylylene). The continuous polymeric film which formed on the walls was easily stripped therefrom and was shown by infrared spectrum to be identical with other poly(chloro-p-xylylene) films formed by other methods. The conversion of dimer to polymer was about 85 percent.

Since certain changes and modifications can be readily entered into in the practice of the present invention without departing substantially from its intended spirit or scope, it is to be fully understod that all of the foregoing description and specification be interpreted and construed as being merely illustrative of the invention and in no sense or manner as being limiting or restrictive thereof excepting as it is set forth and defined in the appended claims.

What is claimed is:

1. Apparatus for coating substrate surfaces with poly (p-xylylenes) which comprises a source of di-p-xylylene, a vaporization-pyrolyzation oven completely encompassing said source and providing a labyrinthine passageway to the surfaces to be coated, heated means integral with said passageway adapted to simultaneously vaporize and pyrolyze the di-p-xylylene to the reactive monomeric p-xylylene diradicals, a chamber providing the surfaces to be coated completely encompassing said source, oven and heating means, and means for maintaining a vacuum within said chamber, whereby the reactive p-xylylene diradicals are emitted from said passageway and condense and polymerize on the surface to be coated.

2. Apparatus for coating substrate surfaces with poly (p-xylylenes) which comprises a source of di-p-xylylene, a vaporization-pyrolyzation oven completely encompassing said source and comprised of a plurality of inversely nested vessels, each of said vessels having lateral side walls and one end wall and being substantially open at one end, each of said vessels being of conforming size and shape with all other vessels such that when a vessel is inserted in a spaced relationship into another vessel with the open end of said vessel adjacent the interior face of the end wall of said other vessel, a labyrinthine passageway is formed from the source to the surfaces to be coated; heating means integral with said vessels adapted to simultaneously vaporize and pyrolyze the di-p-xylylene to the reactive monomeric p-xylylene diradicals; a chamber providing the surfaces to be coated completely encompassing said source, oven and heating means, and means for maintaining a vacuum within said chamber, whereby the reactive p-xylylene diradicals are emitted from said passageway and condense and polymerize on the surfaces to be coated.

3. Apparatus as defined in claim 2 which contains as an additional element, a conduit for di-p-xylylene, said conduit communicating the source of di-p-xylylene within the oven with a continuous source of di-p-xylylene outside the chamber completely encompassing said oven.

4. Apparatus for coating substrate surfaces with poly (p-xylylenes) which comprises a source of di-p-xylylene, a vaporization-pyrolyzation oven completely encompassing said source and comprised of a continuous microporous wall adapted to receive said source, heating means affixed to said microporous wall adapted to vaporize and pyrolyze the di-p-xylylene to the reactive monomeric p-xylylene diradicals upon egress through said microporous wall, a chamber providing surfaces to be coated completely encompassing said source, oven and heating means, and means for maintaining a vacuum within said chamber, whereby the reactive p-xylylene diradicals emitted from the microporous wall condense and polymerize on the surfaces to be coated.

5. Apparatus as defined in claim 4 wherein the vaporization-pyrolyzation oven is comprised of a continuous electrically non-conducting but heat conducting microporous wall.

6. Apparatus as defined in claim 4 wherein the vaporization-pyrolyzation oven is comprised of a continuous electrically and heat conducting microporous wall thereby providing a unitary oven and heating means.

7. Apparatus according to claim 2 wherein the means for heating said inversely nested vessels is a heating element continuously wound about the surfaces of each of said inversely nested vessels.

8. Apparatus as defined in claim 5 wherein the continuous microporous wall has capillaries therethrough providing a labyrinthine exit passageway of sufficient length to effect efficient conversion of vaporized di-p-xylylene to p-xylylene diradicals therein.

9. Apparatus as defined in claim 5 wherein the capillary pore openings are between about 0.1 to about 200 microns in diameter.

10. Apparatus as defined in claim 5 wherein the heating means is a heating element continuously wound about the surface of said continuous electrically non-conducting microporous wall.

11. Apparatus according to claim 5 wherein the microporous wall is comprised of porcelain.

12. Apparatus according to claim 5 wherein the microporous wall is comprised of sintered glass.

13. Apparatus as defined in claim 6 wherein the continuous microporous wall has capillaries therethrough providing a labyrinthine exit passageway of sufficient length to effect efficient conversion of vaporized di-p-xylylene to p-xylylene diradicals therein.

14. Apparatus as defined in claim 6 wherein the capillary pore openings are between about 0.1 to about 200 microns in diameter.

15. Apparatus according to claim 6 wherein the microporous wall is comprised of sintered metal.

16. Apparatus according to claim 6 wherein the microporous wall is comprised of graphite.

References Cited by the Examiner

UNITED STATES PATENTS

| 2,381,006 | 8/1945 | Scott | 165—161 X |
| 2,785,090 | 3/1957 | Kirk | 117—106 |
| 3,024,009 | 3/1962 | Booth et al. | 165—111 X |
| 3,155,158 | 11/1964 | Peters et al. | 165—611 |

OTHER REFERENCES

Errede et al.: Journal of the American Chemical Society, October 1960; pp. 5218 to 5227 relied on.

MORRIS KAPLAN, *Primary Examiner.*

RICHARD D. NEVIUS, *Examiner.*